United States Patent [19]

Gnau et al.

[11] 3,726,997

[45] Apr. 10, 1973

[54] OPTICAL PROCESSING SYSTEM

[75] Inventors: Donald V. Gnau; Buckley C. Pierstorff, both of East Aurora, N.Y.

[73] Assignee: Cornell Aeronautical Laboratory, Inc., Buffalo, N.Y.

[22] Filed: Feb. 26, 1969

[21] Appl. No.: 802,547

[52] U.S. Cl. ......178/6.8, 350/162.5 F, 340/146.3 Q, 340/146.3 AC

[51] Int. Cl. ............................G06k 9/00, H04n 3/00

[58] Field of Search ...................340/146.3; 235/181; 356/156, 162, 168; 350/162 SF; 178/6.8

[56] References Cited

UNITED STATES PATENTS 3,211,898 10/1965 Fomenko......................340/146.3 X 3,413,735 12/1968 Erbert ..........................340/146.3 X

*Primary Examiner*—Benjamin A. Borchelt

*Assistant Examiner*—S. G. Buczinski

*Attorney*—Allen J. Jaffe

[57] ABSTRACT

An optical processing system for detecting the presence of certain shapes in a scene, having a bipolar aperture mask, a lens, a television camera located beyond the focal plane of the lens, a stripped mask adjacent the camera; the aperture mask has portions, corresponding to the shape to be detected, of dissimilar optical properties, and adjacent strips of the stripped mask have respective optical properties corresponding to that of each of the respective portions of the aperture mask.

4 Claims, 5 Drawing Figures

INVENTORS
DONALD V. GNAU.
BUCKLEY C. PIERSTORFF
BY Allen J. Jaffe
ATTORNEY

INVENTORS
DONALD V. GNAU.
BUCKLEY C. PIERSTORFF.
BY [signature]
ATTORNEY

OPTICAL PROCESSING SYSTEM

BACKGROUND OF THE INVENTION

The present invention relates to an optical processing system and, more particularly, to an apparatus for detecting the presence and location of particular shapes present in a scene.

Successful use of pattern recognition techniques on a digital computer often hinge on the portion of the system concerned with pattern input and the ability of this portion of the system in locating, registering and properly orienting the desired shapes or patterns for computer processing. The speed of the serial digital processing of the pattern information, once digitized and entered into a recognition computer, is relatively slow. However, if an optical preprocessor can be used to locate the candidate patterns on the object scene, the processing requirements for the recognition computer are decreased twofold. First, only the areas of the object scene which contain the desired patterns need be considered for computer processing, and second, processing to properly rotate and center these patterns is not required. The inherent advantages offered by parallel, two dimensional optical processing greatly increase the capabilities of the overall system.

In an attempt to satisfy the real time requirements, so necessary to realize the time saving advantages noted above, two electro-optical devices have been heretofore proposed. One utilized a two-channel flying spot scanner having positive and negative aperture masks in separate optical channels with subtraction performed electrically. This device required a transparency of the scene. Another approach, which would accept real scenes, uses two television cameras as sensors. Each camera would view the scene through either a positive or negative aperture mask, and subtraction would be performed with the video signal output of the cameras. Consideration of the scan linearity problems and requirements on sensitivity linearity over the scene surface renders this approach impractical.

SUMMARY OF THE INVENTION

The foregoing disadvantages, as well as others, are overcome according to the present invention which uses a single television camera or other suitable detector and a single bipolar aperture mask to perform an electro-optical cross-correlation on a real or photographic scene. The scene may be illuminated by broadband incoherent light, and a cross-correlation image is formed during every frame of the television system.

Basically, the present invention provides a means for multiple processing of optical scenes in a single optical electronic system using optical bipolar masks to image the scenes, in alternate vertical strips, onto the sensitive surface of a scanning device such as a television camera tube. During the subsequent scanning the processing of the alternate stripes is completed. This alternation process allows the use, through time-sharing, of common optical and/or electronic equipment to accomplish multiple processing.

BRIEF DESCRIPTION OF THE DRAWINGS

For a fuller understanding of the present invention reference should now be had to the following detailed description thereof taken in conjunction with the accompanying drawings wherein.

DESCRIPTION OF THE PREFERRED EMBODIMENTS

Figure 1:
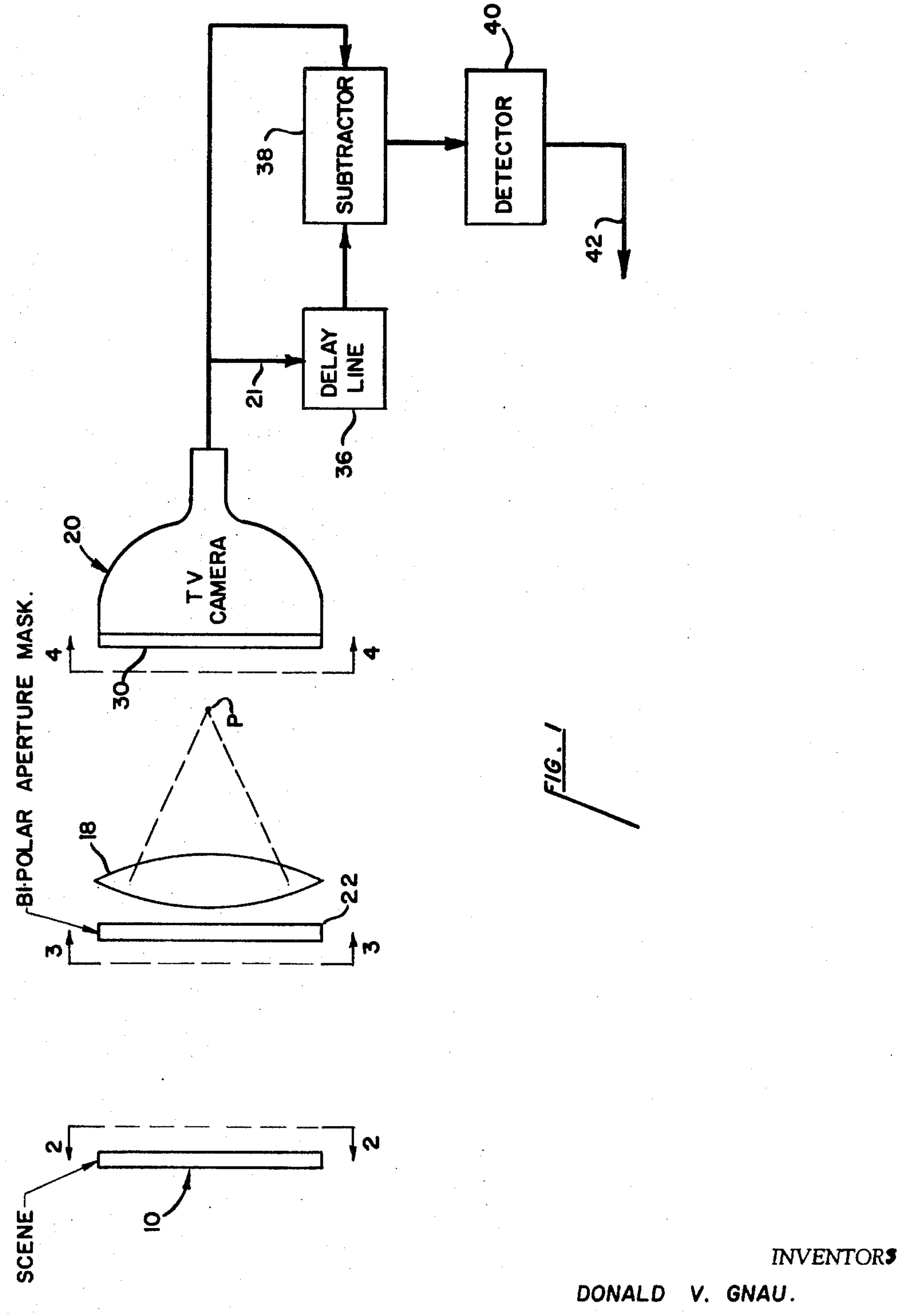
FIG. 1 is a schematic diagram, with parts thereof shown in block form, of the apparatus according to the present invention.
Figure 2:
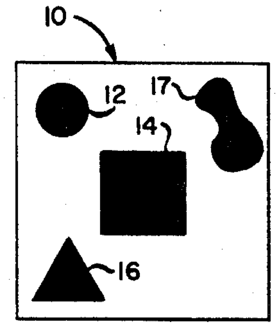
FIG. 2 is a section taken along line 2—2 of FIG. 1.

Referring now to the drawings and, more particularly, to FIG. 1, a scene containing the shape to be detected is depicted generally by the numeral 10. The scene might comprise an opaque photograph, a transparency or the actual real objects. As shown more clearly in FIG. 2 the scene may consist of various geometric shapes such as a circle 12, a square 14, a triangle 16 and an irregular shape 17.

A lens or suitable lens system 18 is provided for imaging the scene onto the face of a television camera, generally depicted at 20. As shown the focal point of the lens 18 is at P and the television camera is spaced from the focal plane of the lens, for a purpose to become apparent hereinbelow. A bipolar aperture mask 22 is provided adjacent the lens 18. If a lens system is used, the aperture mask would be located between the lens elements in the place normally occupied by the diaphragm.

Figure 3:
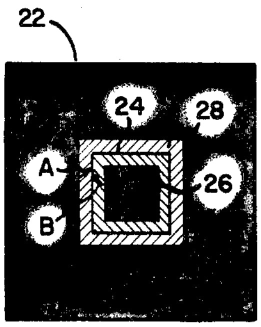
FIG. 3 is a section taken along line 3—3 of FIG. 1.

The bipolar aperture mask contains the shape of the object to be detected in the scene and functions as a matched spatial filter to transmit a signal indicative of the presence of and location of the object of interest. Assuming the object of interest to have the shape of a square the aperture mask would consist of the outline of a square 24 bordered by adjacent annular inner and outer square regions, 26 and 28, respectively, as shown in FIG. 3. Regions 26 and 28 have different optical properties, whereas the remainder of the mask is substantially opaque. For example region 26 can be polarized at right angles to the polarization of region 28, such that light passing therethrough has a polarization vector oriented perpendicularly with respect to the polarization vector of the light passing through region 28. These vectors are depicted at A and B, respectively in FIG. 3. Alternatively region 26 could be of a material having a dissimilar color transmissivity than the material of region 28. The important point is, as will become apparent, region 26 will not transmit the light passing through region 28 and vice versa.

Figure 4:
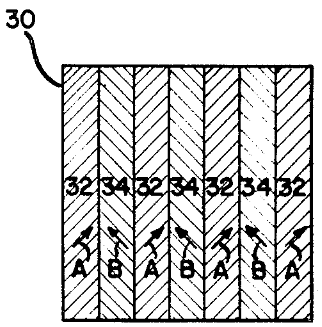
FIG. 4 is a section taken along line 4—4 of FIG. 1.

The face of television camera 20 contains a stripped mask 30, which, as shown more clearly in FIG. 4, comprises a sheet of spaced vertical columns of polarized material, alternate strips 32 of which have a plane of polarization corresponding to the polarization of region 28 of the aperture mask 22, with the strips in between, depicted at 34, having a perpendicular polarization plane that corresponds to the polarization plane of region 26 of the mask 22. Alternatively the stripped mask could be located between the scene and the bipolar aperture mask.

If region 26 was of a material having a dissimilar color transmissivity than the material of region 28, then the transmissivity of strips 34 would correspond to that of region 26 and the transmissivity of strips 32 would correspond to that of region 28.

A delay line 36, which might typically comprise an Allen Avionics Type "NV" (10–100 nano seconds tapped), is connected to the output of camera 20, via line 21 as is a subtractor 38, which might typically comprise a differential amplifier of video band width. A detector 40 is connected to the output of the subtractor, delivering a signal via line 42 to a suitable indicating and/or displaying device such as an oscilloscope (not illustrated). The detector 40 might comprise conventional components such as two differential amplifiers with their output OR'd together for full wave detection.

As is known, when an object is viewed through an aperture mask in a plane that is spaced from the focal plane of the aperture lens, light impinging on the viewing surface will be most intense at the location of the object when the mask corresponds in shape and size to the shape and size of the object. For a more detailed discussion of this phenomenon, reference may be had to "The Journal of the Optical Society of America, Volume 54, No. 10, October 1964."

Figure 5:
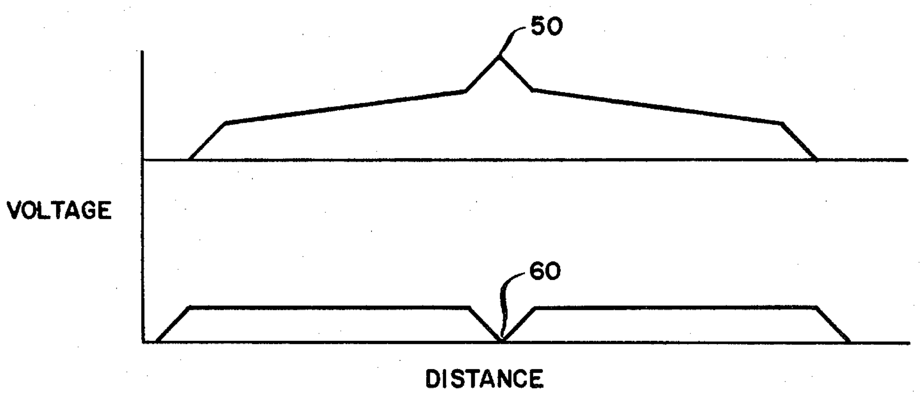
FIG. 5 is a graphical depiction of the positive and negative signals appearing along a chosen television line.

Thus when camera 20 scans the scene through mask 22, signals will be delivered that are most intense in the area of the scene containing the square shapes that correspond to the square shape of the mask. These signals passing through vertical strips 32 will bias the television camera in one sense whereas the signals passing through strips 34 will bias the camera in the opposite sense. As shown in FIG. 5, the scan line of the camera through the center of the square 14 in scene 10, due to the image impinging on strips 32, will be most intense in the center of the line as shown at 50. Also as shown in FIG. 5, the scan line of the camera through the center of the square, due to the image impinging on strips 34, will be least intense in the center of the line as shown at 60. The signals due to light impinging on strips 32 and 34 are subtracted by comparator 38 and the difference passes through detector 40 which thresholds the signal and delivers an output via line 42. In this manner when the signals at 50 and 60 are subtracted the intensity of the signal of interest is greatly increased in comparison with the noise signals which are reduced.

Although a preferred embodiment of the invention has been described, modifications will occur to those skilled in the art. Therefore, it is intended that the invention is to be limited by the scope of the appended claims.

We claim:

1. An optical processing system, comprising;
a. a scene containing various shapes, one class of which is to be detected,
b. lens means for imaging said scene, including a bipolar aperture mask having portions of dissimilar optical properties, each generally corresponding in shape to the shape of said class to be detected,
c. detection means located in a position spaced from the focal plane of said lens means for developing an output signal in response to the optical output of said lens means,
d. a stripped mask, each of the adjacent strips of which have respective optical properties corresponding to that of each of the respective portions of said bipolar aperture mask,
e. delay means responsive to the output signal from said detection means for developing a delayed output signal,
f. subtraction means responsive to the output signal from said detection means and the delayed output signal from said delay means for developing a difference signal, and
g. detector means responsive to said difference signal for developing an output signal indicative of the class of shapes to be detected.

2. The system according to claim 1, wherein;
h. said optical properties are color transmissivities.

3. The system according to claim 1, wherein;
h. said optical properties are polarization planes.

4. The system according to claim 1, wherein;
h. said detection means comprises a television camera, and
i. said stripped mask is located adjacent the face of said television camera.

* * * * *